United States Patent [19]

Strom et al.

[11] Patent Number: 4,665,520

[45] Date of Patent: May 12, 1987

[54] OPTIMISTIC RECOVERY IN A DISTRIBUTED PROCESSING SYSTEM

[75] Inventors: Robert E. Strom, Ridgefield, Conn.; Shaula Yemini, New York, N.Y.

[73] Assignee: International Business Machines Corporation, Armonk, N.Y.

[21] Appl. No.: 697,536

[22] Filed: Feb. 1, 1985

[51] Int. Cl.[4] .............................................. G06F 11/00
[52] U.S. Cl. ....................................... 371/7; 364/200
[58] Field of Search ........................... 371/7, 9, 11, 12; 364/200, 900

[56] References Cited

U.S. PATENT DOCUMENTS

| | | | |
|---|---|---|---|
| 3,517,171 | 6/1970 | Avizienis | 235/153 |
| 3,692,989 | 9/1972 | Kandiew | 371/11 |
| 3,768,074 | 10/1973 | Sharp et al. | 364/200 |
| 3,775,566 | 11/1973 | Akimaru et al. | 371/9 |
| 3,786,430 | 1/1974 | Hajdu et al. | |
| 4,053,871 | 10/1977 | Vidalin et al. | 340/146.2 |
| 4,321,666 | 3/1982 | Tasar et al. | |
| 4,356,546 | 10/1982 | Whiteside et al. | |
| 4,371,754 | 2/1983 | De et al. | |
| 4,381,540 | 4/1983 | Lewis et al. | 364/200 |
| 4,412,281 | 10/1983 | Works | |
| 4,443,849 | 4/1984 | Ohwada | 364/200 |
| 4,493,035 | 1/1985 | MacGreger | 371/7 |
| 4,503,535 | 3/1985 | Budde | 371/11 |
| 4,521,847 | 6/1985 | Ziehm | 371/7 |
| 4,590,554 | 5/1986 | Glazer | 371/7 |

FOREIGN PATENT DOCUMENTS 2032149  4/1980  United Kingdom .

OTHER PUBLICATIONS

Davies, C. T., Recovery Semantics for a DB/DC System, Proceedings of the ACM National Conference, 1973, (Atlanta, Ga., Aug., 24-29), ACM, New York, pp. 136-141.
Bjork, L., Recovery Scenario for a DB/DC System, Proceedings of the ACM National Conference, 1973, (Atlanta, Ga., Aug. 24-29), ACM, New York, pp. 142-146.
Gray, J. et al., The Recovery Manager of the System R Database Manager, Computing Surveys, vol. 13, No. 2, 1981.
Liskov, B. et al., Guardians and Actions: Linguistic Support for Robust Distributed Programs, 9th Annual Symposium on Principles of Programming Languages, NM, 1982, pp. 7-19.
Lindsay, B. et al., Efficient Commit Protocols for the Tree of Processes Model of Distributed Transactions, Proceedings of the 2nd ACM SIGACT/SIGOPS Symposium on Principles of Distributed Computing, 1983, pp. 76-88.
Borg et al., A Message System Supporting Fault Tolerance, 9th ACM Symposium on Operating System Principles, Oct., 1983, pp. 90-99.
Bartlett, J. F., A 'Non-Stop' Operating System, 11th Hawaii International Conference on System Sciences, 1978.
Schneider, F. B., Fail-Stop Processors, Digest of Papers Spring Compcon '83, IEEE Computer Society, Mar. 1983, pp. 66-70.
Strom, R. E. et al., Optimistic Recovery in Distributed Systems, ACM Transactions on Computer Systems, vol. 3, No. 3, Aug. 1985, pp. 204-226.

*Primary Examiner*—Michael R. Fleming
*Attorney, Agent, or Firm*—Marc A. Block

[57] ABSTRACT

In a distributed system whose state space is partitioned into recovery units, wherein recovery units communicate by the exchange of messages and wherein a message received by a recovery unit may causally depend on other recovery units having received prior messages, a method of recovering from failure of any number of recovery units in the system comprising the steps of: (a) tracking the dependency of each message received by a recovery unit in terms of the causative messages received by other recovery units in the system; and (b) restoring all recovery units to a consistent system-wide state after recovery unit failure by means of the tracked message dependencies.

47 Claims, 5 Drawing Figures

AT TIME OF RUA CRASH

OPTIMISTIC RECOVERY IN A DISTRIBUTED PROCESSING SYSTEM

FIELD OF THE INVENTION

The present invention relates to fault tolerant distributed data processing systems.

BACKGROUND OF THE INVENTION

As the demand for greater computing power and for greater availability of computer processing to users has increased at a tremendous rate in recent years, system designers have looked beyond the uniprocessor-based system to systems which include a collection of coupled processors. Such multiprocessor systems, in the form of distributed systems, are typically configured so that each processor can perform processing operations which can be communicated to other processors in the system or to external devices as appropriate.

In the various types of currently proposed multiprocessor system architecture, a major concern relates to the possible failure of one or more of the processors in the system and how the system may recover correctly and efficiently from such failure. In this regard, system recovery after failure—which determines the reliability of the system—is particularly difficult in the distributed system because some processors can fail while others continue to run.

Moreover, recovery is further complicated in that the processors interact, the operations performed by one processor depending on operations performed by other processors in the system. When recovering from a failure in one processor, the failed processor in various prior systems is rolled back to an earlier state saved at a checkpoint. Other processors must then be rolled back to earlier checkpoints as the system attempts to return to a consistent system-wide state. The rollbacks may be unbounded leading to a problem referred to as "cascading rollbacks" or the "domino effect". That is, in seeking a consistent state between processors in the system, one processor after another is driven to progressively earlier checkpoints with no predefined stopping point. Several approaches to system recovery which avoid the domino effect have been suggested.

One approach to achieving fault tolerance in a distributed multiprocessor system without the domino effect is based on a transaction model. According to this approach, computation is divided into units of work called "transactions" which satisfy several predefined assumptions. Because computation in many distributed systems cannot be structured as transactions, this approach is limited in application. In addition, the transaction approach appears more tailored to implementing a single logical process by executing non-interfering parts in parallel. For applications whose logical structure includes multiple logical processes, the transaction approach is relatively expensive. The following articles consider transaction models in which recovery is built into an operating system: "Recovery Semantics for a DB/DC System" *Proceedings of the ACM National Conference*, 1973, by C. T. Davies; "Recovery Scenario for a DB/DC System", *Proceedings of the ACM National Conference*, 1973, by L. Bjork; "The Recovery Manager of the System R Database Manager", *Computing Surveys*, volume 13, number 2, 1981, by J. Gray et al.; and "Guardians and Actions: Linguistic Support for Robust Distributed Programs", *9th Annual Symposium on Principles of Programming Languages*, NM, 1982, by B. Liskov and R. Scheifler. An article by C. Mohan and B. Lindsay (Efficient Commit Protocols for the Tree of Processes Model Of Distributed Transactions", *Proceedings of the 2nd ACM SIGACT/SIGOPS Symposium on Principles of Distributed Computing*, 1983) relates to the synchronous logging and checkpointing of records into stable storage.

Another proposed approach to avoiding the domino effect is to synchronize checkpointing and communication. In an embodiment by Borg et al.—in "A Message System Supporting Fault Tolerance", *9th ACM Symposium on Operating System Principles*, October, 1983—implementing this approach, the system is described in terms of processing units and processes. A "processing unit" is defined as a conventional computer. Processing units communicate by means of messages over some medium. Each processing unit runs its own copy of the operating system kernel to perform processes. A "process" is defined as an execution of a program that is controlled by the operating system kernel. In accordance with the Borg et al. embodiment, there is a primary process and a backup process each of which resides in a different processing unit. The primary process and the backup process contain identical code. At the start of computation and periodically thereafter, the state of the primary process is checkpointed by being copied to the backup process. Additionally, each input message received by the primary process is also provided to the backup process. If the primary process fails, the backup process executes messages stored since the latest checkpoint. This embodiment requires four-way synchronization upon each communication: the primary process and backup process of the sending processing unit, and the primary process and the backup process of the receiving processing unit. The Borg et al. embodiment cannot tolerate arbitrary multiple failures. For example, if the processing unit of the primary process and the processing unit of the backup process fail, recovery is impossible.

Another embodiment of the synchronized recovery approach described by J. R. Bartlett in "A 'Non-stop' Operating System", *11th Hawaii International Conference on System Sciences*, 1978, requires three-way synchronization and also does not tolerate arbitrary multiple failures.

In the synchronized recovery approach, the state of each process is checkpointed upon each message communication, so that rollback is never necessary. However, when on processing unit sends a message to another processing unit, neither can continue processing until both have logged a checkpoint. The synchronous recovery approach avoids the domino effect problem, however pays throughput and response-time penalties due to the required synchronization.

Hence, while the problem of reliable and effective recovery from failure in a distributed system has been considered, a general method and apparatus for recovering from multiple failures has not been taught—especially where message communication, processor operations (such as computation and message generation), checkpointing, and committing of output to external devices can proceed asychronously.

SUMMARY OF THE INVENTION

Therefore, it is an object of the present invention to provide a fault-tolerant distributed system which can reliably recover from failure in any number of processing components.

Moreover, it is an object of the invention to provide an "optimistic recovery" approach which permits message communication, processing component operations, checkpointing, and output committing to proceed fully asynchronously. Where synchronous recovery approaches have required that a message be logged before a processing unit perform operations in response thereto, optimistic recovery permits a processing component to make computations or perform other operations in response to an incoming message before the incoming message is logged into stable storage.

It is also an object of the present invention to provide the restoring of a distributed system to a consistent system-wide state after failure wherein recovery is characterized as: application-transparent (i.e., software need not be redesigned to be recoverable); application-independent (i.e., recovery applies to arbitrary applications); featuring high throughput (i.e., the multiple processors being exploited when no failures occur); and being applicable to a wide variety of hardware configurations.

The invention that achieves the above-noted objects and others relates to—in a distributed system whose state space is partitioned into recovery units, wherein recovery units communicate by the exchange of messages and wherein a message received by a recovery unit may causally depend on other recovery units having received prior messages—a method of recovering from failure of any number of recovery units in the system comprising the steps of: (a) tracking the dependency of each message received by a recovery unit in terms of the causative messages received by other recovery units in the system; and (b) restoring all recovery units to a consistent system-wide state after recovery unit failure by means of the identified message dependencies.

Moreover, the invention relates to a method wherein messages are communicated by a sending recovery unit to a receiving recovery unit over sessions, the method comprising the further step of: maintaining, for each combination of sending recovery unit and receiving recovery unit, (a) a session sequence number sent by the sending recovery unit and (b) a session sequence number expected by the receiving recovery unit; a discrepancy between the session sequence number sent by the sending recovery unit and the session sequence number expected by the receiving recovery unit indicating a failure in the distributed system. When there is a failure, a message may be lost when the receiving recovery unit fails after having received the message earlier; a message may be duplicated wherein a sending recovery unit—after having failed—sends a message which the receiving recovery unit has already received; and a message may be an orphan that depends on a lost message or a lost state interval initiated by an input message. These various results of failure are signalled, at least in part, by a discrepancy between the sent and the expected session sequence numbers.

The invention provides recovery of the internal state of a recovery unit by restoring a failed recovery unit to an earliest retained checkpoint and re-playing saved messages forward from that checkpoint. Messages lost due to failure of a receiving recovery unit are sent by the sending recovery unit. Duplicate messages created due to the re-playing of a failed sending recovery unit are deleted. For orphan messages, a determination is made as to whether the orphan message has been merged into a message stream (or queue), has been processed from the queue, and/or has been logged from the queue. Depending on how far the recovery unit has processed the orphan message, it may be deleted, merging may be repeated, and an incarnation number assigned to each message incremented for re-merged messages. The incarnation number is reflection of how many times a recovery unit rolls back or re-merges or re-plays messages in its stream. With re-merge or re-play, the recovery unit—after being restored to an earlier checkpoint—proceeds forward therefrom normally repeating some messages and continuing therefrom. The incarnation number distinguishes (a) new messages generated after a recovery unit has restored its state from (b) messages having possibly the same ordinal number and which may have been sent prior to failure and which are now lost. By examining session sequence numbers and incarnation numbers, faults or failures can be detected and determined.

Also in accordance with an embodiment of the invention, messages are rendered committable for transfer outside the distributed system when it has been determined that all messages which are causal antecedents of the committable message have been logged to stable storage.

The present invention, as defined hereinabove, permits a recovery unit to receive and process a subject message even before states from which causative messages have originated have been made recoverable. Optimistic recovery is made possible by the dependency tracking which, in effect, keeps track of the causative states on which the subject message depends.

If a failure occurs before the causative states have been made recoverable, the causally dependent computations have to be backed out. The dependency tracking serves as a guide as to which computations, if any, must be undone following a failure, in order to restore the system to an internally consistent state.

To achieve a consistent system-wide state, each recovery unit which has processed a message that originated from a state that has not yet been made recoverable, retreats to a respective prior state, or checkpoint, and messages are re-played so that all recovery units recognize the same messages as having been received and processed. For some recovery units this may necessitate "rolling back" which includes restoring to a checkpoint prior to a lost message (or lost state interval) or orphan message and acting on logged messages occurring after the checkpoint so that the recovery unit is brought back to a consistent system-wide state. Messages and computations in a failed recovery unit (possibly on a different physical machine from the one used before the failure) can then proceed. Because dependency tracking is maintained and the state corresponding to each prior message received by a recovery unit may be reconstructed, logging recovery information onto stable storage need not be synchronized with message processing. Also, each recovery unit rollback is bounded—that is, rollback cannot precede the checkpoint immediately prior to the latest state of the recovery unit all of whose causal antecedents are logged.

The invention may be described, in sum, as optimistic recovery in a distributed system based on causal dependency tracking which enables computation, message logging, checkpointing, and committing to proceed asynchronously and which features application-transparency, application-independence, essentially non-stop operation, and adaptability to various hardware configurations. The foregoing and other objects, features and advantages of the invention will be apparent from the description of the embodiments of the invention as set forth below and as illustrated in the accompanying drawings. Advantages of the present invention may also be noted in a paper by the co-inventors hereof entitled "Optimistic Recovery: An Asynchronous Approach to Fault-Tolerance in Distributed Systems," presented at the 14th Symposium on Fault Tolerant Computing Systems in June, 1984.

DESCRIPTION OF PREFERRED EMBODIMENTS OF THE INVENTION

Figure 1:
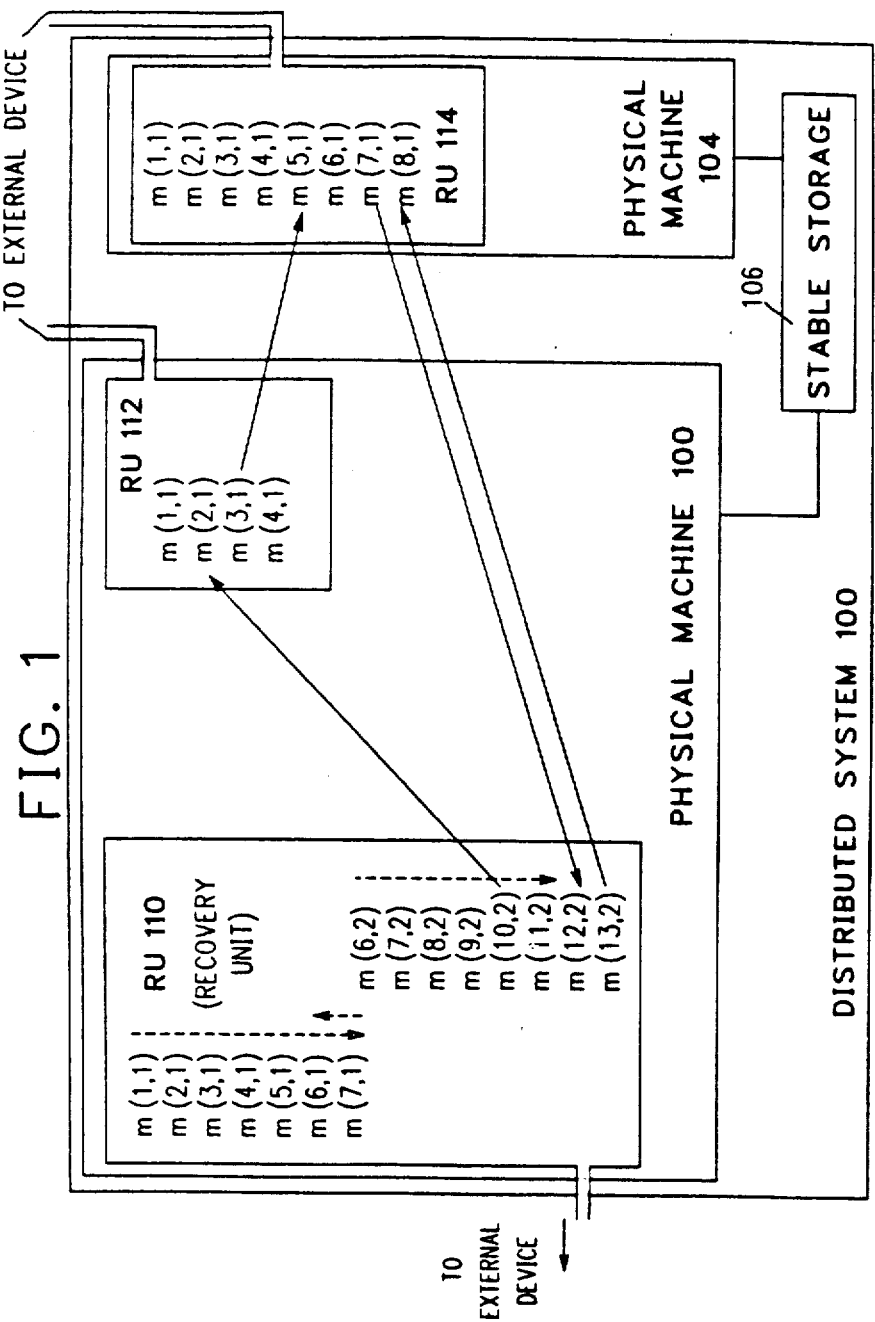
FIG. 1 is a general diagram of a distributed system the state space of which is partitioned into recovery units which communicate by the exchange of messages, wherein at least some of the messages are shown to causally depend on previously communicated messages.

Referring to FIG. 1, a simple, general embodiment of a non-halting distributed operating system 100 is shown according to the invention. A distributed system herein is considered a collection of interconnected processors, wherein the interconnection can be by point-to-point links, by broadcast links such as local area networks, by shared memory, or by other known means.

From the physical perspective, the system includes physical machines 102 and 104 and a stable storage element 106. The physical machines 102 and 104 are in the present embodiment IBM 370 computers, although other conventional computers may also be employed. The physical machines 102 and 104 form a closely coupled network which—when implemented according to the invention as discussed hereinbelow—allows rapid recovery from various types of failure in the system while permitting all the physical machines 102 and 104 to perform useful computations at a high throughput rate when there is no failure.

From a logical perspective, the distributed system 100 may be viewed as a state space partitioned into a plurality of recovery units 110, 112, and 114. That is, each recovery unit operates in an address space. The address space numbers can be unique across the whole system if there are few enough recovery units. This is practical in a NIL environment, in which address spaces are not needed for protection purposes. Addresses do not change when a recovery unit is relocated to another physical machine, so they may be used as "long pointers" and may appear in checkpoints.

Each recovery unit 110, 112, and 114 is shown associated with a particular physical machine—recovery units 110 and 112 being associated with physical machine 102 and recovery unit 114 being associated with physical machine 104. These assignments are not fixed, in that a recovery unit may shift from one physical machine to another when, for example, there is failure in a physical machine. The number of physical machines and recovery units may vary as desired for a given distributed system.

In operation, the recovery units 110 through 114 cooperate to process one or more application programs by communicating messages between the recovery units 110 through 114 during message exchange sessions. In addition, recovery units 110 through 114 receive input messages from devices external to the system 100 and also direct output messages to devices external to the system 100. The external devices may include any of various known peripheral devices, such as but not limited to printers and I/O devices in general. The external devices may vary widely in intelligence and communication capability.

When a recovery unit (e.g. recovery unit 110) receives an input message, it can respond by (a) performing processing operation hereafter referred to generically as "computations", (b) generating output messages directed to another recovery unit as an input message thereto or to an external device, or (c) both. In FIG. 1, messages are identified by the prefix m.

Figure 2:
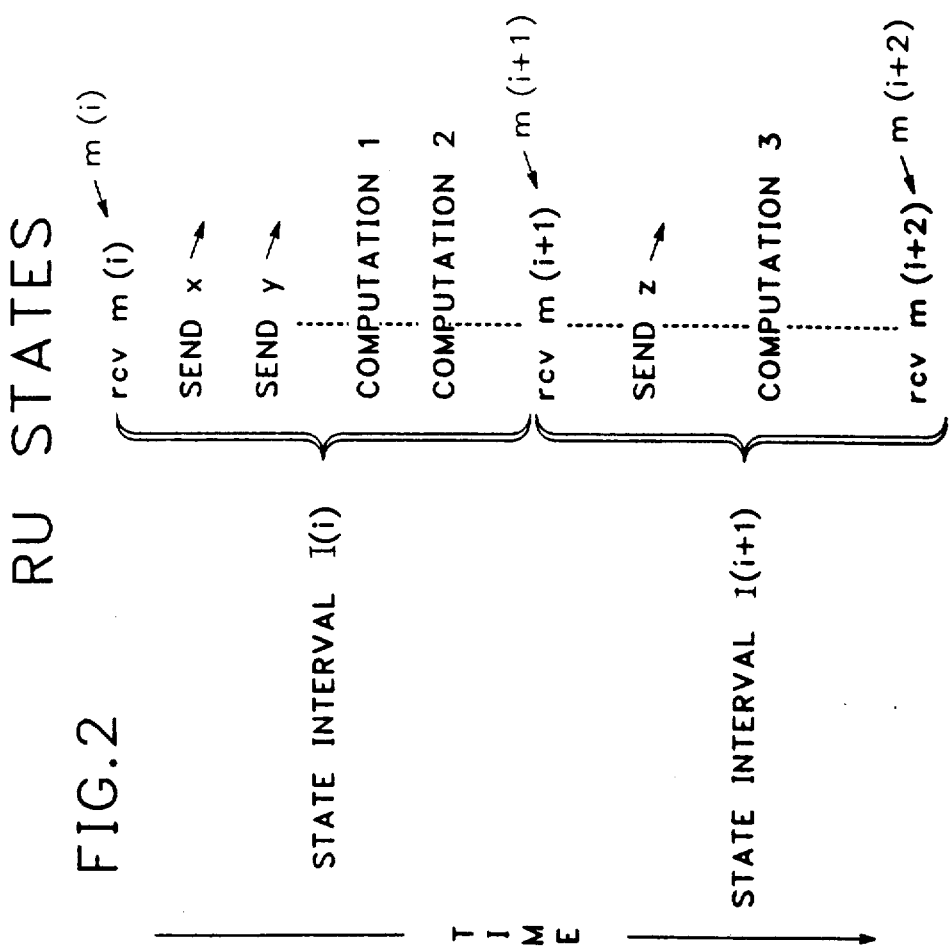
FIG. 2 is a time diagram illustrating changes in the state of a recovery unit as input messages in a stream are processed thereby.

In FIG. 2, the results effected by input messages are illustrated. Specifically, three sequential input messages $m(i)$, $m(i+1)$, and $m(i+2)$ are received for processing by a recovery unit. As each input message is received, a corresponding state interval $I(i)$, $I(i+1)$, and $I(i+2)$, respectively, is initiated. During each state interval, computations and output messages are generatable according to application programming and host operating system design.

The host operating system, it may be noted, on each physical machine is responsible for allocating the central processing unit (CPU) resources thereof among the recovery units. Since recovery units relocate between physical machines in the event of failure, the host operating system is prepared to execute a variable number of recovery units. As between each pair of recovery units there is one channel whereby the first recovery unit can send messages in first-in first-out (FIFO) fashion to the second recovery unit and a second channel whereby the second recovery unit can send messages in FIFO fashion to the first recovery unit. The host operating system supports the reliable communications channels between recovery units, which are insensitive to physical link failure and to the relocation of recovery units between physical machines. A host operating system employed with the guest operating system of the invention may be represented by any of various known multiprocessor systems such as the IBM MVS system or virtual machine (VM) network system.

In a given state interval, the state of a recovery unit may change a number of times as computations are performed. As message $m(i)$ is received, state interval $I(i)$ begins. In response to the input message $m(i)$, message x is sent followed by message y being sent. Messages x and y may be sent to another recovery unit as an input message or to some external device as mentioned hereinabove. After messages x and y are sent, computations 1 and 2 are performed in sequence. When message $m(i+1)$ is received, a new state interval $I(i+1)$ corresponding thereto is initiated during which message z is sent and computation 3 performed. With each computation, the state of the recovery unit changes.

The recovery units are characterized as being deterministic. That is, when in a given state, a recovery unit (RU) will perform the same operations in the same way to generate the same computations and/or output messages and/or state changes in the RU whenever a given input message is received and processed thereby. Hence, each recovery unit is configured so that, given a particular state thereof, the recovery unit will process a given stream of input messages the same way each time the stream is processed. Recovery according to the invention may thus be viewed as based on "repeatable execution". Repeatable execution implies that, by restoring a previous state and the exact sequence of events which were processed thereafter, the exact behavior of a given recovery unit can be restored after a failure, or crash.

Returning again to FIG. 1, an input message m(2,1) to recovery unit (RU) 112 is shown being received for processing by RU 112 after a message m(1,1) has been processed by RU 112 during a corresponding state interval. (It should be understood that messages processed by each recovery unit have a standard notation and that message m(a,b) of one RU is distinct from message m(a,b) of another RU. The "a" refers to an ordinal number in a stream of messages of a corresponding recovery unit. The "b" refers to an incarnation number described in detail hereinbelow.)

RU 112 is also shown having received another input message identified as m(3,1) which follows message m(2,1). The message m(3,1) may have originated at another RU (not shown) or from an external device. In either case, the processing of message m(3,1) by RU 112 causes an output message therefrom which is directed to RU 114 as an input message m(5,1). Thereafter, in RU 114, input messages m(6,1) and m(7,1) are received and processed in sequence, the latter input message causing the sending of a message to RU 110 identified, when merged into the message stream of RU 110, as message m(12,2). After message m(12,2), another input message m(13,2) is received and processed by RU 110. The message m(13,2), in turn, causes a further input message which RU 114 identifies as m(8,1) thereof.

In following the sequence of messages from one RU to another, it is evident that some input messages to a given RU depend on other prior messages which are received and processed as input messages to other RUs. Message m(2,1) of RU 112, for example, is "causally dependen" on RU 110 receiving and processing message m(10,2) thereof. Similarly, message m(5,1) of RU 114 is causally dependent on the receiving and processing of input message m(10,2) of RU 110 and on the receiving and processing of input message m(3,1) of RU 112.

These causal dependencies are reflected in FIG. 1 by Dependency Vectors (DV). A first dependency vector extending from message m(10,2) of recovery unit 110 to message m(2,1) of RU 112 is set forth as a triplet indicating the input messages to RU 110, RU 112, and RU 114 upon which the message m(2,1) of RU 112 causally depends. The dependency vector notation is similarly applied to one input message after another in the sequence discussed hereinabove. In examining the dependency vector after message m(13,2) of RU 110 which leads to input message m(8,1) of RU 114, it is noted that the first component of the vector—which corresponds to RU 110—is (13,2). This signifies that message m(8,1) of RU 114 is causally dependent on the state interval initiated by message m(13,2) of RU 110. Each recovery unit includes storage in which the current dependency vector is stored and a processing component (see FIG. 3) which updates the dependency vector as appropriate.

In updating its dependency vector, a recovery unit performs the following steps in the processing component thereof. Initially, it should be realized that each message sent has appended thereto the current value of the dependency vector (hereafter referred to as "DV") of the state interval from which the message is generated. This is suggested by the vectors indicated in FIG. 1. The processing component of the receiving RU examines the DV of each message received, when that message is ready for processing. At that time, a new state interval is initiated and the updating of the DV takes place. Letting $M_k(n) \cdot DV$ be the dependency vector of an nth incoming message to a recovery unit $RU_k$, each dependency vector component $DV_k(i)$ is determined to be:

$$DV_k(i) = \begin{cases} DV_k(i) + 1 & \text{for } i = k \\ \max(DV_k(i), M_k(n) \cdot DV(i)) & \text{for } i \neq k \end{cases}$$

In words, the vector component $DV_k(i)$—also notated as $d_i$—for the recovery unit receiving the message (i.e. $i=k$) is simply the previous state interval number or message number incremented by one. This implies that each state interval of a recovery unit is causally dependent on the previous state interval thereof. For dependency vector components relating to the other recovery units (i not equal to k), the processing component of the receiving recovery unit $RU_k$ compares (a) the value of the particular ith component as it has been stored in $RU_k$ and (b) the value of the same particular ith component as communicated along with the message.

The vector component identifies the more recent of the two compared values which, in the present embodiment, corresponds to the larger value. Because a message generated during a given state interval inherits the dependencies of the given state interval, causal dependence on a state interval of a given recovery unit embodies dependence on previous state intervals in the given recovery unit as well. In this way, the resultant dependency vector indicates dependence on the most recent state interval, of each recovery unit, upon which the new state interval of $RU_k$ (and messages generated therefrom) causally depends.

Figure 3:
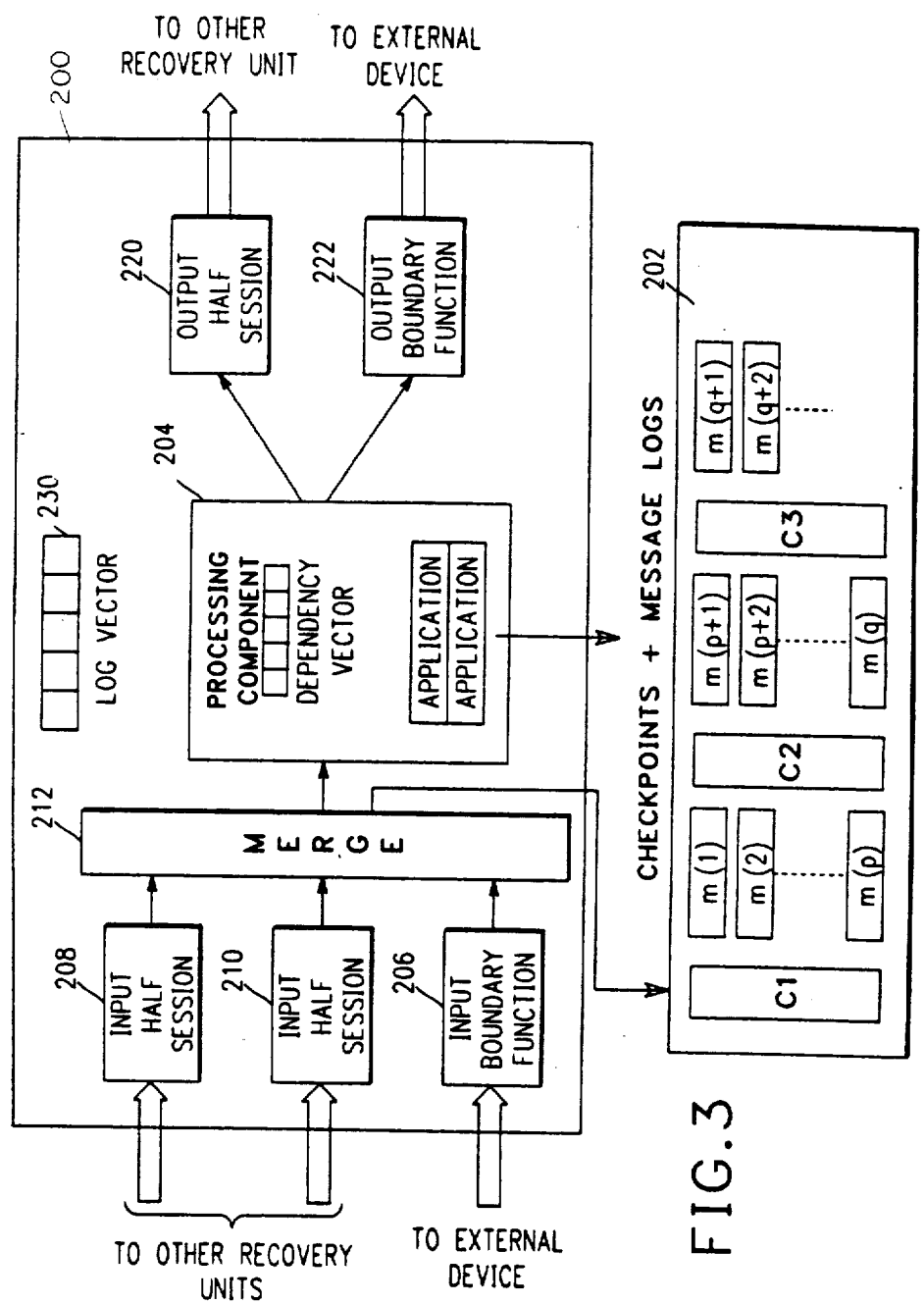
FIG. 3 is a detailed diagram of a recovery unit and the stable storage corresponding thereto.

The manner in which causal dependency tracking is used in recovering a multiprocessor system to a consistent state after failure is explained with reference to FIG. 3 and FIG. 4. In FIG. 3, a representative recovery unit RU 200 is shown together with stable storage 202 (which corresponds to the stable storage 106 of FIG. 1). RU 200 includes a processing component 204 which, as discussed above, maintains an updated dependency vector in storage provided with preferably one cell for each recovery unit in the system. In FIG. 3, there are five cells indicating that the system comprises five recovery units.

Input messages to the processing component 204 originate at various sources, such as other recovery units and external devices. The protocol which receives incoming messages from an external device in an input boundary function 206. Depending upon whether the input is from a programmable device or from a fixed source, different implementation options are possible.

If the device is not aware of the fact that it is communicating to the distributed system and cannot conveniently be reprogrammed to do so, then the external device must be thought of as an input source only. Any "acknowledgement" sent to the device is an output of the distributed system, and is therefore withheld until committed. If the input device is a terminal, or some other communications subsystem, this may cause delays and timeouts since, at the very least, the acknowledgement must wait for a receiving recovery unit to log the message into stable storage.

If the internal boundary function (IBF) 206 understands the behavior of the device, it can perform its own acknowledgements. That is, IBF 206 may automatically acknowledge upon being informed that the recovery unit 200 has logged the input, provided that the device can tolerate waiting that long for such acknowledgements. IBF 206 may send earlier acknowledgement, provided it knows that the device does not assume that acknowledgement implies commitment of the input.

If the device is programmable, and can be programmed to exploit conventions embodied in the distributed system, a communications protocol is contemplated whereby a "communications acknowledgement" is given early, to inform the device that its message has been received and that the next message may be sent, and a "recovery acknowledgment" is given later, to inform the device that it need not assume recovery responsibility for the message.

If the device has a stable storage, it can perform sender logging, thereby relieving the receiving recovery unit from the responsibility of logging the data. This may be useful, since the meassage may have been in stable storage to begin with, and duplicate logging is thereby avoided.

The protocol which receives an input message from another recovery unit is called an input half session. FIG. 3 shows two input half sessions 208 and 210 by way of example, it being recognized that in the FIG. 3 embodiment there are a total of four other recovery units that have links or channels to send input messages to RU 200. Input messages from input boundary functions and from input half sessions enter a merge function 212 which orders all the incoming messages into a single stream of input messages. The merge function 212 determines the order in which messages are to be received for processing by the processing component 204. The merge function 212, by way of example, is in the present embodiment a simple FIFO discipline that orders incoming messages based on their respective times of arrival.

In addition to directing the ordered stream of input messages to the processing component 204, the merge function 212 also directs the ordered stream therefrom into stable storage 202. One input message after another is logged in the stable storage 202 for RU 200 as indicated by the message notations provided in FIG. 3. Significantly, although the input messages are directed to the processing component 204 and to the stable storage 202 in the same order, the present invention permits the processing component 204 and the stable storge 202 to handle the messages asynchronously. In this regard, it should be noted that the present invention can be employed where there is synchronization between processing, logging, and checkpointing—as would be required by synchronous recovery systems of prior technology. However, unlike those prior systems, the present invention also allows the processing component to perform computations and generate output messages before or after a subject input message is logged.

The asynchrony between performing computations and logging suggests that the recovery process of the present invention is "optimistic". That is, while synchronous recovery systems limit actions on the assumption that a failure will occur and, hence, all input messages must be logged before processing, the present invention permits processing to continue unhalted until a failure is detected. The present invention proceeds optimistically, permitting computations to be generated and messages sent to other recovery units, which can also perform operations and send messages, without a requirement for prior logging. As will be discussed below, this unhalted operation is achieved by use of the causal dependency tracking.

Referring further to the stable storage 202, three checkpoints C1, C2, and C3 are shown separating groups of input messages. A checkpoint is, in effect, a snapshot indicating the state of a given recovery unit at a particular instant in time. Checkpointing is well-known in the art. In the present invention, however, the checkpoints may be taken at selected times which are preferably, but not necessarily, asynchronous with the logging of input messages in stable storage 202 and/or the processing of messages by the processing component 204. The timing of the checkpoints is a tuning option wherein more frequent checkpoints may suggest more disk activity. Less frequent checkpoints suggest that message logging will require more memory space and restoring a particular state by restoring a previous checkpoint and re-playing messages therefrom will require more time.

Still referring to FIG. 3, a sample output half session 220 and an output boundary function 222 are shown. For each other recovery unit, RU 200 has an output half session. The output half session 220, like each other output half session, is linked to a corresponding input half session of another recovery unit. Extending between the output half session 220 and the corresponding input half session of some other recovery unit is a reliable channel over which messages are passed. Such channels between recovery units in different physical machines comprise known links such as message passing services of commercially available networks. Channels between recovery units in a single physical machine comprise any of various known local message services—such as VM/CF.

The output half session 220 serves several functions in conjunction with the input half session to which it is linked. In discussing these functions, it should be noted that one recovery unit sends messages to another recovery unit in sessions via the channel, or link, therebetween.

When directing messages from output half session 220 to the input half session of another recovery unit, RU 200 represents a sending recovery unit while the other represents a receiving recovery unit. A first function of the output half session 220 is to keep a count of the number of messages RU 200 has communicated through the output half session 220. The count is embodied in a sending session number which increments with each session message. At the same time, the input half session linked to the output half session 220 maintains an expected session sequence number indicating what session message the receiving recovery unit is expecting. The session sequence number of the sending recovery unit is appended to each message sent on a link in a given session. The input half session compares its expected session sequence number with the appended session sequence number. If the two session sequence numbers do not correspond, a failure is indicated. Messages may have been lost or duplicated due to some failure. In either case, at least the sending recovery unit and receiving recovery unit are in inconsistent states. When such a condition exists, the present invention responds to restore the system to a consistent state wherein all recovery units recognize the same messages being sent and received.

The second function of the output half session is to save each sent message until informed by the receiving recovery unit that the receiving recovery unit has logged the sent message.

The output boundary function 222 represents a link to the world outside the system. The output boundary function 222 typically inhibits the sending of an output message to an external device until the output message is "committed". Commitment suggests that the output message is not relatable to an event which may have been affected by a failure. Commitment is required where the external device is non-recoverable, i.e. cannot take part in the recovery procedure performed by the recovery units. Output Boundary Functions also participate in the protocols for local backout of logs. Each output boundary function determines for a corresponding recovery unit the latest logged state upon which a committed message depends, so that later logged messages may be treated as unlogged.

As with the input boundary function 206, the output boundary function (OBF) 222 can exploit the intelligence in the device to which it interfaces, if it is intelligent and that fact is known to the OBF. For example, suppose a particular OBF 222 is routing messages to a host computer running a transaction-oriented database system. Such a system processes messages, executes transactions, and commits them. According to the present invention, the recovery unit 200 may not send a message out until it has been committed. However, if OBF 222 knows it is talking to the database system, it may perform optimistic commitments by sending uncommitted messages out. The database system will be designed to run the transaction and wait for a final signal to commit or abort. The OBF 222 additionally provides these commit or abort signals whenever a particular output message either becomes committable or is recognized to be an orphan message. If a commit signal is provided before the transaction is completed, the database system continues running, sending the committed outtput therefrom without interruption. If the message turns out to have been an orphan, the database machine will have wasted work in processing it and backing it out, but this is compensated for by the improved response time in the more frequent case where the message will be eventually committed.

In determining whether an output message held in the output boundary function 222 should be committed for communication outside the system (see system 100 of FIG. 1), a log vector 230 (hereafter referred to as LV) is maintained. The LV is a notation indicating what information has been logged. Specifically, each recovery unit maintains a log vector containing its current knowledge of how far each other recovery unit has logged. As seen in FIG. 3, LV has a cell for each recovery unit. Each cell contains a number identifying the most recent state interval recognized as logged by a respective recovery unit.

With regard to implementing the logging performed by the recovery units of the present operating system, several alternative methods are contemplated. In general, each method provides for the logging into stable storage of (a) the data of the message communicated, (b) the dependency vector of the message (if it originated at another recovery unit), and (c) a message identifier which is typically an ordinal number-incarnation number pair.

The first method for realizing the logging steps is referred to as receiver direct logging. According to this method, the receiving recovery unit writes record after record to stable storage. The "last logged message" is considered to be the last message logged wherein all previous messages have been logged. If messages 1 through 7 and 9 have been acknowledged as logged, the "last logged message" will be considered message 7 in that a message prior to message 9 (i.e. message 8) has not been logged. For each channel between a sending recovery unit and a receiving recovery unit, the receiving recovery unit acknowledges to the sending recovery unit the number of the sender session sequence number of the latest message sent by the sending recovery unit and logged by the receiving recovery unit. This acknowledgement is carried on a reverse path of the channel, piggybacked on data or on communications acknowledgments. The receiving recovery unit may at any time lose unlogged received messages; however, if they have been merged, the merge program backs up to account for the lost message(s). The receiving recovery unit then demands that the sending recovery unit re-send messages beginning at a specific sender session sequence number.

In a sender direct logging alternative method, the sending recovery unit keeps the data as part of its state in the event of a crash of the receiving recovery unit. Since the log data also includes the association between each sent message and the receiving recovery unit's input message identifier—as assigned by the merge program—the sending recovery unit obtains this information from the receiving recovery unit. Acknowledgements from the receiving recovery unit therefore contain the assigned receiver input message identifier as part of the acknowledgement data. The sender stores these identifiers associated with each message. If the receiving recovery unit crashes, the sending recovery unit re-sends the message data together with the receiver input message identifier and the receiving recovery unit uses this data to perform the merge of messages therein.

Commitment of a subject output message from a given recovery unit is determined by comparing the log vector of the given recovery unit with the dependency vector for the subject output message. If each component of the log vector is more recent than each corresponding component of the dependency vector, the output message is committed. Similarly, a state interval is committed if characterized by a log vector, each component of which is more recent than the corresponding component of the dependency vector related thereto.

Worthy of note, the performing of computations, the logging of messages, checkpointing, and the committing of output messages are preferably asynchronous. Computations, for example, are performed even before prior messages are logged and/or committed. Moreover, while the dependency vector is updated with each message communication, the log vector information may be sent from one recovery unit to the other recovery units at less frequent intervals.

The interval at which messages are logged and the time it takes for one recovery unit to inform the other recovery units of the logging affect the commitment delay. However, so long as all messages are eventually logged and the logging is communicated to the other recovery units, output messages can be committed.

Figure 4:
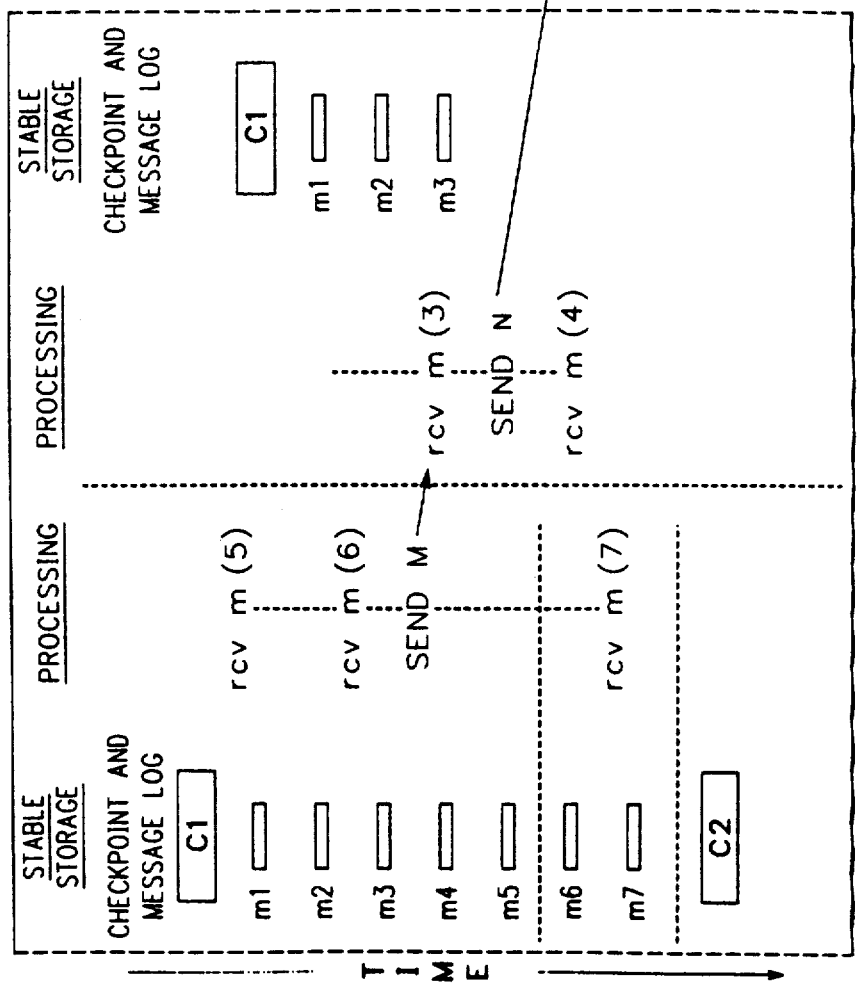
FIG. 4 is an illustration showing two recovery units in operation, wherein the first recovery unit is shown sending a message to the second and the second has generated a message for communication outside the system.

In FIG. 4, message processing, message logging, checkpointing, and committing are illustrated. With time being measured vertically downward, recovery unit RUI and recovery unit RUII ae shown. RUI has performed two checkpoints C1 and C2, with seven input messages m1 through m7 being logged therebetween. Between the checkpoint C1 and the logging of message m1, the processing component of RUI has received message m5 for processing. Computations and/or output messages generated in response to message m5 have occurred in the state interval initiated by message m5. Between the logging of messages m2 and m3, message m6 was received for processing. In the state interval corresponding to message m6, an output message M was generated by RUI and sent to RUII. The message M was received for processing by RUII as message m3 of RUII. After the sending of message M by RUI and between the logging of messages m6 and m7, message m7 was received for processing.

In RUII, input message m3 was received for processing between the logging of messages m2 and m3 of RUII. In response to the receiving of input message m3 by RUII, RUII sends a message N destined for a printer 300 external to the system (see system 100 of FIG. 1). After message N is sent, RUII receives an input message m4 for processing.

In the scenario set forth in FIG. 4, two times t1 and t2 are considered. The effect of a failure at each time t1 and t2 is examined to show how the present invention commits output messages based on dependency tracking.

If a failure occurs at time t1, it is noted that message M has been sent to RUII from RUI and that RUII has generated message N. Message N, as discussed hereinabove, is buffered in the output boundary function of RUII. RUII determines that message N depends on state interval 3 of RUII and that state interval 3 (and message m3) of RUII, in turn, causally depend on message m6 of RUI. While message m3 of RUII has been logged by time t1, message m6 of RUI has not been logged by time t1. Comparing dependency with logged messages, RUII determines that message N cannot be committed because it depends on a message m6 of RUI which has not been logged.

At time t2, however, message m6 of RUI and message m3 of RUII have both been logged. If a failure occurs at time t2, message N is committable since the two messages (and state intervals) upon which it depends have been logged.

In achieving recovery when a failure has been detected, rollback may be required. With rollback, a recovery unit returns to a previous checkpointed state and, with replay, the program is re-executed starting in the checkpointed state, receiving as inputs the logged messages in the same order as previously received for processing. Due to the deterministic character of each recovery unit, rollback should result in repeated execution of events up to the time of failure so that processing can continue thereafter without being affected by the failure condition, or crash, except that some recent state resulting from messages received but not logged, may be lost.

Because input messages are repeated each time rollback and re-play occurs, the present system identifies each message and state interval initiated thereby with two numbers: (1) an ordinal number indicating the relative position of the message or state interval in the stream thereof and (2) an incarnation number representing the number of times a recovery unit has rolled back and replayed messages. In FIG. 1, the messages are identified by the ordinal number followed by the incarnation number. If the system proceeds without failure or rollback, the incarnation number remains the same and only the ordinal number changes. If failure or crash occurs, the incarnation number increments for messages after rollback has occurred. That is, for messages that are re-played, the pre-rollback incarnation number still applied. For messages continuing after the message rolled back to, an incremented incarnation number applies.

In some instances, messages must be re-merged before processing and logging proceed. In such instances, the incarnation number for the re-merged messages is incremented.

With the operating system architecture described above, recovery according to the present invention can be followed. Let a sending recovery unit direct a message to a receiving recovery unit. The input half session of the receiving recovery unit receives a message having the sending session sequence number appended thereto. Also communicated is the sending recover unit's dependency vector and the sending recovery unit's log vector. The receiving recovery unit determines whether the sending session sequence number corresponds to the session sequence number expected by the receiving recovery unit.

If the session sequence number received by a receiving recovery unit is greater than and thereby more recent than the session sequence number expected by the receiving recovery unit, the sending recovery unit resends messages to the receiving recovery unit starting with the message corresponding to the session sequence number expected by the receiving recovery unit. This situation arises when a receiving recovery unit, having already recevied a number of messages, fails and is restored to an earlier state.

If the session sequence number received by a receiving recovery unit is less than and thereby earlier than the session sequence number expected, the receiving recovery unit makes the following decisions, wherein the receiving recovery unit expects an SSN of N but receives a message identified with an SSN of K (less than N). First, a determination is made whether the log for K has been discarded. If yes, the message is a duplicate and may be discarded. If no, a decision is made as to whether the incarnation number of K equals the logged incarnation number. If yes, the message is a duplicate which can be discarded. If no, the old K is an "orphan" which is discussed immediately hereinafter.

If the session sequence number received by the receiving recovery unit is less than and thereby earlier than the session sequence number expected and the incarnation number for a received message is greater than and thereby newer than that of the previously received message on a given session having a particular session sequence number, the previously received message is recognized as an "orphan" message in that it depends on a lost message or state interval. The treatment of an orphan message varies depending on how far along the orphan has been processed. If the orphan message has not been merged, the orphan message is simply deleted. If the orphan message has been merged but neither logged nor processed, the orphan message is deleted and merging is repeated. If the orphan message has been merged and logged but not processed, (a) the orphan message is deleted from the log and from the merged stream, (b) the merging is repeated, inputting all messages subsequent to the deleted message except those messages recognized as orphan messages, and (c) the incarnation count for messages in the repeated merge is incremented. Otherwise, the log vector which reported that the orphan was logged, would be interpreted as indicating that its substitute—having the same message number—was logged. If the orphan message has been merged and processed, logged or not, (a) the receiving recovery unit is rolled back to the last state interval prior to the earliest orphan message recognized in the log, (b) the message stream is reconstructed from all non-orphan messages received subsequent to the state interval rolled back to, and (c) the incarnation count for the messages in the reconstructed stream is incremented.

The procedure detailed above for optimistically recovering a system having a state space partitioned into a plurality of recovery units addresses failures of the fail-stop type as described by F. B. Schneider in "Fail-stop Processors", *Digest of Papers Spring Compcon '83*, IEEE Computer Society, March 1983. That is, failures are detected immediately and cause the stopping of all affected recovery units. This stop triggers the recovery procedure of the present invention. In addition and more generally, however, the system achieves recovery when failure is detected before any state or message is committed to be communicated to the outside world or, in a more specific case, to a non-recoverable external device.

In accordance with the invention, it is also assumed that failure does not occur when a recovery unit is re-executed on another physical machine.

In a specific embodiment of the invention, software failures which repeat upon re-execution are addressed by altering the order of messages during merger. That is, the merger algorithm is perturbed during re-merger. In that it is the processing which must be deterministic and not the merge algorithm, this perturbation does not otherwise affect recovery according to the invention.

In addition, to maximize the chance of full recovery from software failure, as much of the recent history as possible is discarded upon failure. To do so, the earliest state number $d_i$ for each recovery unit $RU_i$ is computed such that no output boundary function has committed any message dependent upon interval $I_i$ ($d_i$). It is then safe for each recovery unit to roll back, pretending that all messages numbered $d_i$ and thereafter have not been merged. Those of the unmerged messages which depend upon only committed states are retained and re-merged, while other messages are discarded.

Figure 5:
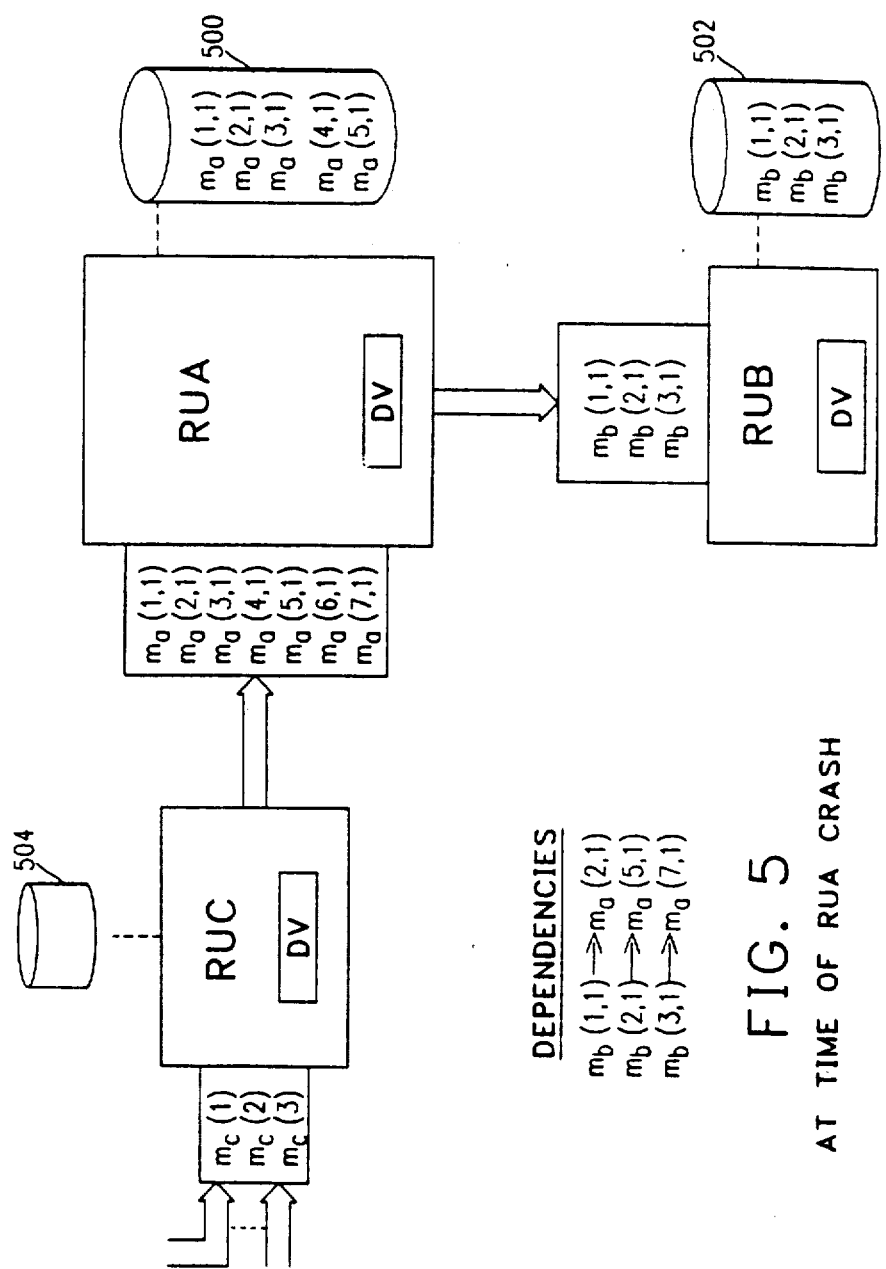
FIG. 5 is an illustration showing three recovery units at the time one of the recovery units fails, or crashes.

Referring to FIG. 5, an example of recovery according to the invention is illustrated. Three recovery units RUA, RUB, and RUC are shown. The recovery units communicate with each other over message sending sessions as discussed hereinabove. RUC has sent messages to RUA which RUA has identified as $m_a(1,1)$, $m_a(2,1)$, ..., and $m_a(7,1)$. According to this notation, the subscript identifies the recovery unit while a first number of an ordered pair associated therewith corresponds to the ordinal number of the message in the merged stream (or queue) and a second number corresponds to the incarnation number thereof.

RUA is shown sending messages to RUB. These messages are identified as $m_b(1,1)$, $m_b(2,1)$, and $m_b(3,1)$.

In RUC, messages are identified without incarnation numbers because there is only one incarnation thereof in the present example. Because RUC has only one incarnation, there is no need to distinguish between messages in different incarnations. By not including the incarnation number when there is only one incarnation, storage requirements are reduced.

In the sample message exchange of FIG. 5, the following message dependencies—appended to each message as a corresponding dependency vector—are indicated. Specifically, message $m_b(1,1)$ depends on message $m_a(2,1)$, $m_b(2,1)$ on message $m_a(5,1)$, and $m_b(3,1)$ on $m_a(7,1)$.

Each recovery unit, RUA, RUB, and RUC, has a respective stable storage 500, 502, and 504 that indicates which input messages thereto have been logged. Stable storage 500 has logged the first five messages to RUA: $m_a(1,1)$ through $m_a(5,1)$. The stable storage 502 has logged messages $m_b(1,1)$ through $m_b(3,1)$ to RUB.

Also associated with each recovery unit, RUA, RUB, and RUC, is a dependency vector corresponding to each checkpoint written in each respective recovery unit. That is, as one checkpoint after another is written into stable storage—500 for example—there is a dependency vector appended thereto. Each component of a checkpoint dependency vector is compared to a corresponding component for a log vector stored for each recovery unit. If all messages (or state intervals) upon which a checkpoint depends have been logged, all checkpoints previous thereto are not necessary and may be discarded. The most recent checkpoint that does not depend on unlogged information must be retained to provide a starting point from which messages thereafter (which may be unlogged) may be processed. The most recent checkpoint which does not depend on unlogged information may be referred to as the earliest retained checkpoint for a given recovery unit.

In the example of FIG. 5, it is supposed that RUA crashes after (i) messages $m_a(1,1)$ through $m_a(7,1)$ have been processed and messages $m_a(1,1)$ through $m_a(5,1)$ have been logged and (ii) messages $m_b(1,1)$ through $m_b(3,1)$ have been processed and logged. Because messages $m_a(6,1)$ and $m_a(7,1)$ have not been logged before the failure, they are "lost" messages. Messages $m_b(1,1)$ and $m_b(2,1)$ depend on only logged messages and, hence, are not failure-affected. Message $m_b(3,1)$, however, depends on a lost message—$m_b(7,1)$—and is therefore an "orphan" message.

To recover from the crash of RUA, each recovery unit acts independently so that each recovery unit in the system eventually recognizes the same exchanges of reliable messages. To achieve this, recovery unit RUA loads its earliest retained checkpoint and re-plays the first five messages as messages $m_a(1,1)$ through $m_a(5,1)$ identified still as the first incarnation. These messages are recovered from stable storage 500 and for re-play by RUA. RUB realizes that messages $m_a(6,1)$ and above were lost and that all events depending therefrom are orphaned and must be discarded. Accordingly, RUB loads its earliest retained checkpoint and re-plays all messages that depend on messages that preceded message $m_a(6,1)$. RUB re-plays its first two messages identified as first incarnation but does not re-play the orphaned third message. After RUA and RUB re-play their respective messages, both RUA and RUB (as well as RUC) recognize that messages $m_a(1,1)$ through $m_a(5,1)$ have been received by RUA and messages $m_b(1,1)$ through $m_b(2,1)$ have been received by RUB. A consistency in state has been achieved.

The next input message to RUA is identified as message $m_a(6,2)$—identified with an incremented incarnation number—which may have come from any other recovery unit and, accordingly may differ from the message $m_a(6,1)$ of the earlier incarnation. RUA and the other recovery units in the system proceed forward as message $m_a(6,2)$ and subsequent messages are entered into the revised and continued stream. Recovery unit 500 stores messages $m_a(1,1)$ through $m_a(5,1)$ and $m_a(6,2)$ et seq. as input messages to RUA in the log. Logged information is retained for old incarnations for as long as it may be needed for recovery in any recovery unit.

It is noted that each recovery unit RUA, RUB, and RUC rolls back messages as necessary independently. That is, each recovery unit determines which input messages thereto are lost or orphaned; returns to the earliest retained checkpoint; and, re-plays its logged messages that do not depend on unlogged information and are valid notwithstanding the failure. Each recovery unit can initially determine where it must return to after failure in order to be unaffected by the failure. Because each recovery unit can roll back independently and because each recovery unit has a predefined point to which it returns, the domino effect is avoided.

It is further noted that RUA can, according to a specific embodiment of the invention, proceed forward after messages $m_a(1,1)$ through $m_a(5,1)$ have been re-played without having to wait for other recovery units to achieve a state free from the effect of lost and/or orphaned messages (or state intervals). For example, RUA may proceed forward with processing message $m_a(6,2)$ and messages thereafter while RUB is re-playing its messages that occurred prior to the orphan message $m_b(3,1)$. If the new message $m_a(6,2)$ results in an input message to a recovery unit unaffected by failure, such unaffected recovery unit is free to process its incoming message. However, if the new message results in an input message to RUB (or some other recovery unit) in the process of recovering, the following approach is employed.

Specifically, the output message enters RUB as message $m_b(4,1)$. This message depends on message $m_b(3,1)$ which is orphaned, thereby making message $m_b(4,1)$ also orphaned. The action of RUB is achieve recovery depends upon how far the orphan message(s) has been processed. If the orphan has not been merged, it is simply deleted. If the orphan has been merged into the input stream of messages, but has not been processed or logged, the orphan is deleted and the merge is repeated. If the orphan has been merged and logged but not processed, the orphan is deleted from the merge and the log; the incarnation count is incremented; and the merge algorithm is repeated using as input all messages subsequent to the deleted message except those messages recognized as orphans. If the orphan has been merged and processed, the recovery unit is returned to the end of the last state interval prior to the first orphan found in the log; a new input stream is reconstructed from all non-orphans following the point to which the recovery unit is returned; and the incarnation count is incremented.

Thus, while the invention has been described with reference to preferred embodiments thereof, it will be understood by those skilled in the art that various changes in form and details may be made without departing from the scope of the invention.

We claim:

1. In a distributed system having a plurality of interconnected processors on which processes are run, apparatus for restoring a consistent system-wide state after one or more processors undergo a failure in which messages processed thereby are lost, or in which the internal states of one or more recovery units of a processor are lost, the apparatus comprising:
   a plurality of logically interconnected recovery units which communicate messages therebetween, wherein each recovery unit corresponds to a set of processes, and wherein a representative recovery unit comprises:
   (a) means for performing computations and generating messages within the representative recovery unit, in response to each incoming message, the set of computations being performed between successive incoming messages representing a state interval of the representative recovery unit;
   (b) means for storing a unique identification for the current state interval of the representative recovery unit; and
   (c) dependency tracking means for storing the state interval identifiers for a system-wide set of state intervals upon which the current state interval of the repesentative recovery unit depends, wherein a state interval A in the representative recovery unit is dependent on a state interval B of a recovery unit if (i) the state interval B precedes the state interval A in the representative recovery unit, (ii) a message sent during the state interval B started the state interval A, or (iii) the state interval A depends upon some other interval which in turn depends upon the state interval B; wherein the respective states of the plurality of recovery units at a given time collectively represent the system-wide state for the given time.

2. Apparatus as in claim 1 wherein said dependency tracking means includes:
   means for tagging onto any output message generated during the current state interval of the representative recovery unit the state interval identifiers stored for the current state interval of the representative recovery unit.

3. Apparatus as in claim 2 wherein said dependency tracking means further includes:
   means for up-dating the stored state interval identifiers when an incoming message is received by the representative recovery unit, the up-dated state interval identifiers being based on (i) the state interval identifiers previously stored for the representative recovery unit and (ii) the state intervals tagged onto a received incoming message.

4. Apparatus as in claim 3 wherein the dependency tracking means comprises means for storing a multi-component dependency vector DV having components $DV_k{}^i$ where k corresponds to the recovery unit for which the vector is being determined and i corresponds to any of the recovery units,
   wherein said up-dating means determines each vector component in accordance with the conditions:

$$DV_k^i \begin{cases} DV_k^{i+1} & \text{for } i = k \\ \max(DV_k^i, M_k^n \cdot DV(i)) & \text{for } i \neq k \end{cases}$$

wherein $M_k^n.DV$ is the dependency vector appended to an nth incoming message to the kth recovery unit.

5. Apparatus as in claim 4 wherein said dependency tracking means for a given recovery unit includes a corresponding dependency vector, said dependency vector indicating the most recent state interval of each recovery unit upon which an output message in a state interval of said given recovery unit depends.

6. Apparatus as in claim 5 wherein a stream of messages of a recovery unit is subject to (a) interruption at a current message and (b) rollback to an earlier message from which the message stream continues forward; and wherein each state interval is represented by an ordinal number indicative of the ordinal position of the input message in the stream of messages and by an incarnation number that increments for messages continuing after the messages rolled back to;

said dependency tracking means, storage means, and commit means each identifying each state interval of each recovery unit with a respective ordinal number and incarnation number.

7. Apparatus as in claim 1 further comprising:

for each recovery unit, a deterministic processing component which receives input messages in a sequence and, in response to each input message, generates computations and output messages as appropriate;

storage means for logging the input messages received by each recovery unit in the sequence in which the input messages were received by the processor of each said recovery unit and for writing, for each recovery unit, successive checkpoints representing the state of said each recovery unit at selectable times; and means for identifying the most recent state interval corresponding to an incoming message logged for each recovery unit by said storage means.

8. Apparatus as in claim 7 further comprising:

commit means for comparing the state intervals identified by the dependency tracking means with the state intervals recoverable through the information logged in the storage means;

an output message being committed by said commit means for communication outside the recovery units when generated in a state interval which depends on only state intervals recoverable from the input messages logged and checkpoints written by the storage means.

9. Apparatus as in claim 8 wherein a stream of messages of a recovery unit is subject to (a) interruption at a current message and (b) rollback to an earlier message from which the message stream continues forward; and wherein each state interval is represented by an ordinal number indicative of the ordinal position of the input message in the stream of messages and by an incarnation number that increments for messages continuing after the messages rolled back to; p1 said dependency tracking means, storage means, and commit means each identifying each state interval of each recovery unit with a respective ordinal number and incarnation number.

10. Apparatus as in claim 9 wherein recovery units communicate in sessions wherein, for each session, one recovery unit is the sending recovery unit and another recovery unit is the receiving recovery unit for such session;

the system further comprising:

means for comparing, for each message exchange from a sending recovery unit to a receiving recovery unit along a particular session, whether the number of the message sent to the receiving recovery unit as counted by the sending recovery unit equals the number of the message next expected to be received as counted by the receiving recovery unit.

11. Apparatus as in claim 9 having m recovery units, wherein a state interval $I_k$ (n) of a recovery unit k depends on state intervals $I_1(d_1)$ for a first recovery unit, $I_2(d_2)$ for a second recovery unit, ..., $I_m(d_m)$ for an mth recovery unit where (a) $d_i = n$ for $i = k$ and (b) $I_i$ $(d_i)$ is the most recent interval of recovery unit i upon which a message in state interval $I_k$ (n) depends for i not equal to k; and wherein said dependency vector of the state interval $I_k(n)$ is represented by the tuple $(d_1, d_2, \ldots, d_m)$.

12. Apparatus as in claim 11 further comprising means for maintaining a log vector wherein each component LV(i) thereof represents the most recent input message logged by said storage means for each ith recovery unit of the m recovery units.

13. Apparatus as in claim 12 further comprising means wherein each component LV(i) of the log vector is updated for a recovery unit receiving a message by assigning to each component LV(i) of the log vector the more recent between (a) the LV(i) of a recovery unit sending the message and (b) the LV(i) of the receiving recovery unit.

14. Apparatus as in claim 13 further comprising means wherein each recovery unit communicates, to all other recovery units, the oldest incarnation number (a) in the log thereof or (b) assigned to any output message thereof which is not committed;

each recovery unit including means for discarding log vector information preceding the oldest incarnation number thereof.

15. Apparatus as in claim 14 further comprising means wherein the dependency vector of each recovery unit is up-dated upon the receiving of an input message for processing, said means for up-dating the dependency vector by making only changes arising from one input message to the next.

16. Apparatus as in claim 15 further comprising:

for each recovery unit, merge means for ordering input messages from all other recovery units into the message stream provided to the corresponding processor and message log of a corresponding recovery unit.

17. A system as in claim 16 wherein each sending recovery unit includes means for appending a corresponding dependency vector to each output message and means for sending the log vector thereof to the receiving recovery unit.

18. In a distributed system logically partitioned into a plurality of recovery units, wherein recovery units communicate by the exchange of messages and wherein a message received by a recovery unit may causally depend on other recovery units having received prior messages, a method of restoring to a consistent system-wide state after a failure in which one or more recovery units received messages which were subsequently lost, or in which the internal state of one or more recovery units is lost, comprising the steps of:

for each recovery unit, starting one successive state interval after another with each successive incoming messages thereto, wherein the respective states of all recovery units at a given time collectively represent a system-wide state at said given time;

tracking the causal dependency of each message generated by a recovery unit on state intervals started by respective messages received by other recovery units in the system;

determining from said dependency tracking which messages and state intervals depend on unrecoverable internal state information lost as a result of the failure; and selectively reverting recovery units back to a system-wide state in which no respective state interval causally depends on a state interval which depends on unrecoverable internal state information lost as a result of the failure.

19. In a distributed system as in claim 18 wherein the receiving of an input message by a recovery unit enters the message-receiving recovery unit into a corresponding state interval in which the message-receiving recovery unit can perform operations that change the state of the receiving recovery unit and can generate output messages, the method comprising the further steps of:

for each recovery unit, (a) processing input messages thereto in a given order by a deterministic processing component, (b) writing checkpoints indicating the state of said each recovery unit at selectable times, (c) logging the input messages in the given order, and (d) identifying each input message and the state interval corresponding thereto by an ordinal number.

20. The method of claim 19 wherein messages are communicated by a sending recovery unit to a receiving recovery unit over sessions, the method comprising the further step of:

maintaining, for each combination of sending recovery unit and receiving recovery unit, (a) a session sequence number recognized by the sending recovery unit and (b) a session sequence number expected by the receiving recovery unit;

a discrepancy between the session sequence number recognized by the sending recovery unit and the session sequence number expected by the receiving recovery unit indicating restart by a recovery unit in the distributed system.

21. The method of claim 20 comprising the further step of:

enabling a message to be committable for transfer to non-recoverable devices when the state of the sending recovery unit from which the message originated is recoverable from stored information including logged input messages and written checkpoints.

22. The method of claim 21 wherein said commit enabling step includes:

comparing (a) the ordinal number of the most recent logged input message for each recovery unit with (b) the ordinal number of the most recent input message for each recovery unit upon which a subject message depends.

23. The method of claim 22 wherein each recovery unit can be restored to a previous state and re-played to continue processing input messages thereafter deterministically in a new incarnation, the method including the further step of:

characterizing each message by an ordinal number and an incarnation number;

said comparing step including:

determining that each message, as identified by ordinal number and incarnation number, upon which the subject message causally depends is recoverable.

24. The method of claim 23 further including the step of:

embedding the dependency tracking and the logging of recovery information in an operating system kernel, the recovery being application transparent.

25. The method of claim 23 comprising the further step of:

discarding logged information relating to a given incarnation for a recovery unit when there are no messages in the given incarnation which are (a) in any recovery unit or (b) being exchanged between recovery units.

26. The method of claim 23 wherein said commit enabling includes:

committing a subject output message for communication outside the distributed system when each message (a) identified by an ordinal number and a non-discarded incarnation and (b) upon which the subject output message causally depends is recoverable from messages that have been logged.

27. The method of claim 26 comprising the further step of:

holding each output message that is to be communicated outside the distributed system in an output boundary function until committed.

28. The method of claim 21 wherein said processing, logging, checkpoint writing, and commit enabling proceed asynchronously.

29. The method of claim 20 comprising the further step of:

discarding checkpoints containing no information that could be needed for recovery by any recovery unit.

30. The method of claim 29 wherein said restoring step includes:

returning a failed recovery unit to the earliest nondiscarded checkpoint thereof;

re-playing the logged input messages forward from the checkpoint returned to and re-generating the computations and output messages performed as a result thereof; and incrementing an incarnation count of a failed recovery unit each time the failed recovery unit re-plays input messages in the order logged and assigning the incarnation count to the messages continuing after the re-played messages.

31. The method of claim 30 comprising the further steps of:

determining when the session sequence number received by a receiving recovery unit is greater than and thereby more recent than the session sequence number expected by the receiving recovery unit;

when the sent session sequence number exceeds the expected session sequence number, communicating to the sending recovery unit the session sequence number expected by the receiving recovery unit; and the sending recovery unit re-sending messages starting with the session corresponding to the expected session sequence number.

32. The method of claim 31 wherein the restoring step comprises the further steps of:
recognizing and deleting duplicate message exchanges; and
recovering lost messages and recovering orphan messages which depend on lost messages.

33. The method of claim 32 wherein the recovery of lost messages includes the steps of:
determining when the session sequence number received by a receiving recovery unit is greater than and thereby more recent than the session sequence number expected by the receiving recovery unit;
the sending recovery unit re-sending messages to the receiving recovery unit starting with the session corresponding to the session sequence number expected by the receiving recovery unit;
the re-sent messages being considered lost.

34. The method of claim 32 wherein the recognizing of duplicate messages includes the steps of:
determining when the session sequence number received by a receiving recovery unit is less than and thereby earlier than the session sequence number expected; and
comparing (a) the incarnation number of a received message having a given ordinal number with (b) the incarnation number of the received message as logged;
a message received with a session sequence number earlier than expected and with an incarnation earlier than that logged being a duplicate message.

35. The method of claim 34 wherein said recognizing of duplicate messages includes the further step of:
determining when a received message has the same ordinal number and incarnation number as a previously received message.

36. The method of claim 34 wherein said recovering of orphan messages includes the steps of:
determining when the session sequence number received by the receiving recovery unit is less than and thereby earlier than the session sequence number expected; and
determining when the incarnation number for a received message is greater than and thereby newer than that of the previously received message on a given session having a particular session sequence number;
a received message with an earlier session sequence number than expected and an incarnation number greater than that of the previous message in the particular session being an orphan message.

37. The method of claim 36 comprising the further step of, for each recovery unit, merging the messages sent thereto into a stream from which one message at a time is processed and logged in the same order asynchronously.

38. The method of claim 37 wherein the recovering of orphan messages includes the steps of:
if the orphan message has not been merged, deleting the orphan message;
if the orphan message has been merged but neither logged nor processed, deleting the orphan message and repeating the merging;
if the orphan message has been merged and logged but not processed, (a) deleting the orphan message from the log and from the merged stream, (b) repeating the merging inputting all messages subsequent to the deleted message except those messages recognized as orphan messages, and (c) incrementing the incarnation count for messages in the repeated merge; and
if the orphan message has been merged, logged, and processed, (a) rolling back the receiving recovery unit back to the last state interval prior to the earliest orphan message recognized in the log, (b) reconstructing the message stream from all non-orphan messages received subsequent to the state interval rolled back to, and (c) incrementing the incarnation count for the messages in the reconstructed stream.

39. The method of claim 38 including the further step of:
altering the merging following a failure in order to reorder the messages in the stream.

40. In a system of recovery units distributed over one computing machine or a plurality of closely coupled computing machines, wherein the recovery units communicate by the direct or indirect exchange of messages and wherein a recovery unit stops when there is a failure thereof in which a message is lost or the internal state thereof is lost, a method of recovering the system to a consistent system-wide state after failure of at least one recovery unit, the method comprising the steps of:
each recovery unit receiving input messages for processing in a prescribed order, wherein the interval between successive incoming messages to a given recovery unit represents a state interval for the given recovery unit during which computations and output messages are generated by the given recovery unit as appropriate in processing the incoming message corresponding thereto, at least some output messages being dependent on a received input message and the state interval corresponding thereto;
logging the input messages to each recovery unit in the prescribed order;
identifying the most recent logged message for the failed recovery unit, all subsequent messages for the failed recovery unit representing lost messages, the most recent logged message corresponding to a pre-lost message state;
communicating an identifier for the most recent logged message to the other recovery units;
identifying any message to any recovery unit as an orphan message when such message depends on a lost message;
if an orphan message generated by a first recovery unit is processed by a second recovery unit, restoring the second recovery unit to a pre-orphan state thereof which is before receipt of the orphan message;
re-playing; after the restoring step, the input messages to the second recovery unit which follow the pre-orphan state; and
re-playing, after the restoring step, the input messages to the given recovery unit which follow the pre-lost message state.

41. The method of claim 40 wherein restoring to a pre-orphan state is to a pre-orphan checkpoint and restoring to a pre-lost message state is to a pre-lost message checkpoint.

42. The method of claim 41 comprising the further step of:

detecting when an input message sent during re-play is a duplicate whic has been previously received for processing by the receiving recovery unit; and discarding the duplicate message.

43. The method of claim 42 comprising the further step of:
discarding checkpoints and logged messages when not required for recovery.

44. The method of claim 43 comprising the further step of:
committing an output message after the checkpoints and logged messages upon which the output message depends have been discarded;
the receiving of input messages for processing, the logging of input messages, and the committing of messages being asynchronous.

45. In a system of recovery units distributed over a plurality of closely coupled computing machines, wherein the recovery units communicate by the exchange of messages directly or indirectly over sessions, wherein each recovery unit maintains a sending session count for each other recovery unit and wherein each recovery unit maintains an expected session sequence count for each other recovery unit and wherein the generation of an output message and computations in one recovery unit may causally depend on messages received as input messages from other recovery units, a method of recovering from failure in which a message is lost or in which the internal state of a recovery unit is lost, the method comprising the steps of:
for each recovery unit, processing messages in an input stream by a deterministic processing component of the recovery unit;
logging messages in each input stream in the order processed;
checkpointing the state of each processing component at successive times and retaining only checkpoints that include information that may be required to recover messages in any recovery unit;
identifying each message by (a) an ordinal number, relative to the recovery unit receiving messages, indicating the ordinal position of a given message in the stream and (b) an incarnation number;
tracking the dependency of each message received by a recovery unit in terms of the causative messages received by other recovery units in the system, each causative message being represented by the identified ordinal number and incarnation number thereof;
for each message sending session between a sending recovery unit and a receiving recovery unit, detecting if the sending session sequence number corresponding to the number of sending sessions recognized by the sending recovery unit differs from the expected session sequence number of the receiving recovery unit;
identifying the most recent logged message for the failed recovery unit, all subsequent messages for the stopped failed recovery unit representing lost messages and states corresponding thereto representing lost states;
communicating the ordinal number-incarnation number for the most recent logged message of the failed recovery unit to the other recovery units;
identifying any message depending on a lost state as an orphan message;
if an orphan message generated by a first recovery unit is processed by a second recovery unit, restoring the second recovery unit back to the earliest checkpoint retained in memory;
re-playing, after the restoring step, the input messages to the second recovery unit which follow the pre-orphan state; and
re-playing, after the restoring step, the input messages to the given recovery unit which follow the pre-lost message state.

46. The method of claim 45 comprising the further step of determining which checkpoints can be discarded and which checkpointed state should be restored for a particular recovery unit by referring to the tracked dependencies of the particular recovery unit.

47. The method of claim 46 comprising the further steps of:
determining when the session sequence number received by a receiving recovery unit is greater than and thereby more recent than the session sequence number expected by the receiving recovery unit and the sending recovery unit re-sending messages to the receiving recovery unit starting with the session corresponding to the session sequence number expected by the receiving recovery unit, the re-sent messages being considered lost;
determining when the session sequence number received by a receiving recovery unit is less than and thereby earlier than the session sequence number expected and comparing (a) the incarnation number of a received message having a given ordinal number with (b) the incarnation number of the received message as logged, a message received with a session sequence number earlier than expected and with an incarnation earlier than that logged being a duplicate message; and
determining when the session sequence number received by the receiving recovery unit is less than and thereby earlier than the session sequence number expected and determining when the incarnation number for a received message is greater than and thereby newer than that of the previously received message on a given session having a particular session sequence number, a received message with an earlier session sequence number than expected and an incarnation number greater than that of the previous message in the particular session being an orphan message.

* * * * *